United States Patent [19]

Lagoni

[11] 4,343,019

[45] Aug. 3, 1982

[54] APPARATUS FOR REDUCING THE EFFECT OF CO-CHANNEL INTERFERENCE ON SYNCHRONIZING PULSES

[75] Inventor: William A. Lagoni, Indianapolis, Ind.

[73] Assignee: RCA Corporation, New York, N.Y.

[21] Appl. No.: 225,772

[22] Filed: Jan. 16, 1981

[51] Int. Cl.³ .................. H04N 9/535; H04N 5/08
[52] U.S. Cl. .................................... 358/31; 358/155; 358/36
[58] Field of Search .............. 358/21 R, 31, 36, 39, 358/153, 155, 167

[56] References Cited

U.S. PATENT DOCUMENTS 2,644,942  7/1953  Bedford .......................... 358/186
4,096,516  6/1978  Pritchard ........................ 358/31
4,185,299  1/1980  Harford ......................... 358/153

OTHER PUBLICATIONS

Lothian, "A Comb Filter for Suppression of Co-Channel Interference on Television Signals", Conference on Radio Receivers and Associated Systems, Southampton, England. (Jul. 11-14, 1978), pp. 121-134.

Primary Examiner—John C. Martin
Attorney, Agent, or Firm—E. M. Whitacre; P. J. Rasmussen; S. J. Stevens

[57] ABSTRACT

An apparatus for reducing the effect of co-channel interference on horizontal synchronization of a television receiver having a comb filter for separating luminance and chrominance signals from a composite video signal comprises a synchronizing pulse separator, coupled to the comb filter output, for driving horizontal synchronizing pulses from the comb filter luminance signal. The co-channel interference beat frequency signals are reduced in amplitude by the comb filter and hence do not disrupt the operation of the synchronizing pulse separator.

2 Claims, 4 Drawing Figures

APPARATUS FOR REDUCING THE EFFECT OF CO-CHANNEL INTERFERENCE ON SYNCHRONIZING PULSES

The invention relates to an arrangement for reducing the disturbance to horizontal synchronizing pulses in television receivers due to co-channel interference.

During the growth of television in the late 1940's, it was found that signals transmitted by two stations operating at the same frequency could be received simultaneously on a single receiver, depending, among other things, on transmitter location, receiver location and atmospheric conditions. This situation was most common where two or more separated transmitting antennas would each provide a sufficient signal that could be received at some intermediate location. The effect of this situation was the creation of co-channel interference. This interference would become apparent, in the case of a relatively weak interfering signal, as a number of black horizontal bars on the screen. These bars were the result of a low frequency beat signal caused by the fact that the two carrier signals were out of phase with respect to each other. A strong interfering signal could cause a picture to appear in the background of the desired program, but the horizontal bars were deemed a more serious problem since they were more visually objectionable and occurred, as previously stated, even with a weak interfering signal.

Research done at that time in an effort to reduce the objectionable nature of the co-channel interference found that synchronizing the carrier signals substantially eliminated the horizontal bars in the picture. This technique, however, required additional equipment and expense by the stations.

Another solution to the problem of co-channel interference was found and involved the use of offset carriers. It was found that if the picture carrier of one station's signal was offset from the other station's carrier, by one half the line frequency (7.867 kHz.) the beat between carriers would then be a very fine pattern and the interfering signal would be of opposite polarity on odd and even lines, causing the interfering signal to become virtually unnoticeable at normal viewing distances. The use of offset carriers was found to be more effective and less complex and costly than synchronized carriers.

It was found, however, that in a situation where three stations were in close enough proximity to cause interference, a carrier offset of one half the line frequency would be ineffective with respect to interference between two out of the three signals. It was, therefore, decided that the carrier offset by two-thirds the line frequency, or 10.5 kHz. which would reduce interference in a three station cluster without significantly reducing the effect as compared with the 7.867 kHz. offset. The 10.5 kHz. carrier offset for stations in close proximity broadcasting on the same frequency was adopted and is in use today.

A problem may occur in some television receivers which is caused by the 10.5 kHz. carrier offset. The offset picture carriers from the desired and the interfering signal may interact in the intermediate frequency stages of the receiver and produce a 10.5 kHz. beat note or signal. This beat note, depending on the strength of the interfering signal, may have sufficient amplitude to exceed the clipping level of the sync separator of the receiver. If this occurs, the deflection circuitry may see the beat frequency signal as a horizontal sync pulse, thereby upsetting the synchronization of the picture and rendering the picture unviewable.

In accordance with the invention, an arrangement is provided for reducing the amplitude of this 10.5 kHz. beat note so that disruption of the normal operation of the sync separator does not occur. In accordance with a preferred embodiment of this invention, a television receiver having a comb filter for separating chrominance and luminance information derives synchronizing pulses from a point in the luminance signal path following the comb filter. This point is preceding the introduction of low frequency information derived from the chrominance signal path which may constitute vertical detail information. In another embodiment, only the horizontal synchronizing pulses are derived following the comb filter, with the vertical synchronizing pulses derived preceding the comb filter.

In the accompanying drawing.

Figure 1:
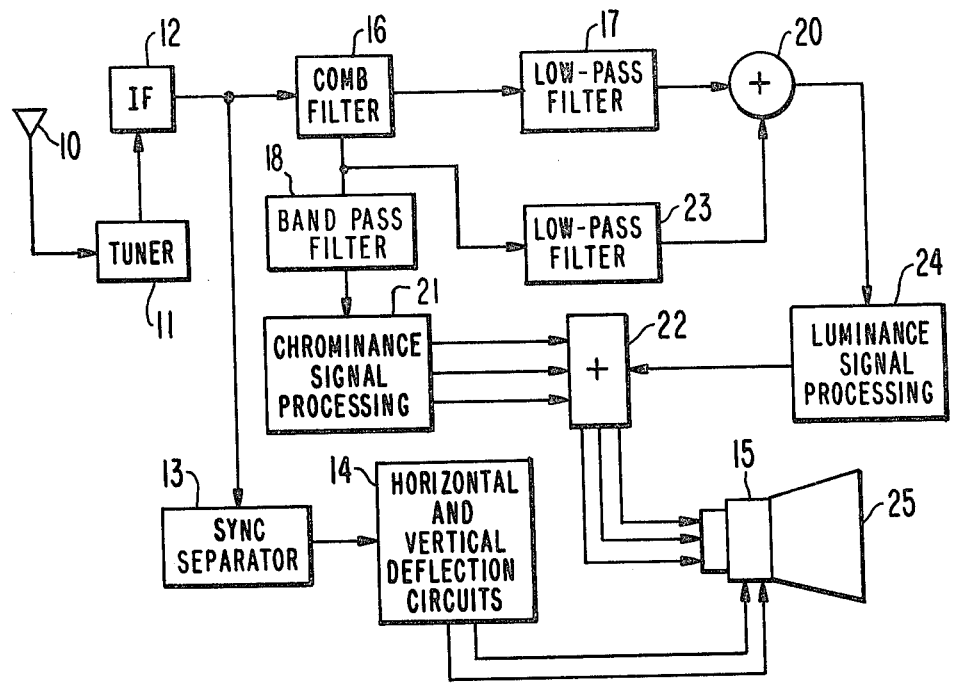
FIG. 1 is a block diagram of a portion of a conventional television receiver having a comb filter for separating chrominance and luminance information.

It is becoming common for color television receivers to use comb filters to separate the chrominance and luminance signals from the composite video signal. The use of comb filters in this manner allows greater horizontal resolution and picture sharpness than was possible with conventional receiver designs. FIG. 1 illustrates in block diagram form circuitry for a color television receiver having a comb filter.

Radio frequency signals are received by the set through antenna 10 which is coupled to a tuner 11. Tuner 11 comprises an oscillator which produces a signal having a frequency determined by the channel selector. This oscillator signal mixes with the incoming RF signal to form an intermediate frequency signal which is amplified and detected by intermediate frequency circuits 12 to form the composite video signal. The composite video signal from IF stage 12 is applied to a sync separator 13 which comprises a threshold detector responsive to the high-amplitude sync pulses in the composite video signal. These sync pulses from sync separator 13 are coupled to the horizontal and vertical deflection circuits 14, which provide suitable signals to drive the deflection yoke 15.

The composite video signal from IF circuits 12 is also applied to a comb filter 16 which separates the frequency interleaved chrominance and luminance signals in the composite video signal. The luminance signal spectrum has peaks at multiples of the line frequency and nulls at odd multiples of one-half the line frequency, while the chrominance signal spectrum has peaks at odd multiples of one-half the line frequency and nulls at multiples of the line frequency. The luminance information signal from comb filter 16 is coupled to a low-pass filter 17 which is designed to pass all signals below a cut-off frequency of approximately 4 MHz. Low-pass filter 17 removes noise and clock frequency components associated with the comb filter. The output of low-pass filter 17 is applied to one input of a summing circuit 20.

The chrominance information signal from comb filter 16 is coupled through a band-pass filter 18, which removes signals outside the chrominance frequency range, to a chrominance signal processing circuit 21 which generates the R-Y, G-Y and B-Y color difference signals. These color difference signals are coupled to a summing circuit 22.

The chrominance information signal is also coupled to a low-pass filter 23 which acts as a vertical detail restoration filter. Low-pass filter 23 passes signals below a cut-off frequency of approximately 2 MHz. and applies these to another input of summing circuit 20. The signals from low-pass filter 23 are combined with the luminance information signals from low-pass filter 17 to restore luminance information that was removed by the interleaving action of comb filter 16. The low frequency restored luminance signal from summing circuit 20 is coupled to a luminance signal processor 24 which generates the Y luminance signal. This luminance signal is applied to summing circuit 22 where it is combined with the color difference signals to derive the R, G, B color signals which are coupled to kinescope 25.

The television receiver illustrated in FIG. 1 may be susceptible to co-channel interference of the form, as previously described, in which the frequency offset picture carrier of the co-channel signals combine to produce a 10.5 kHz. beat note at the output of IF circuits 12. This beat note is applied to sync separator 13 along with the composite video signal, and may have sufficient amplitude to exceed the threshold of sync separator 13. If this occurs, the sync separator will produce a string of horizontal sync pulses at the line frequency of 15.75 kHz. with additional pulses at 10.5 kHz. These additional pulses may disrupt the operation of the deflection circuits 14, producing an unviewable picture.

Figure 2:
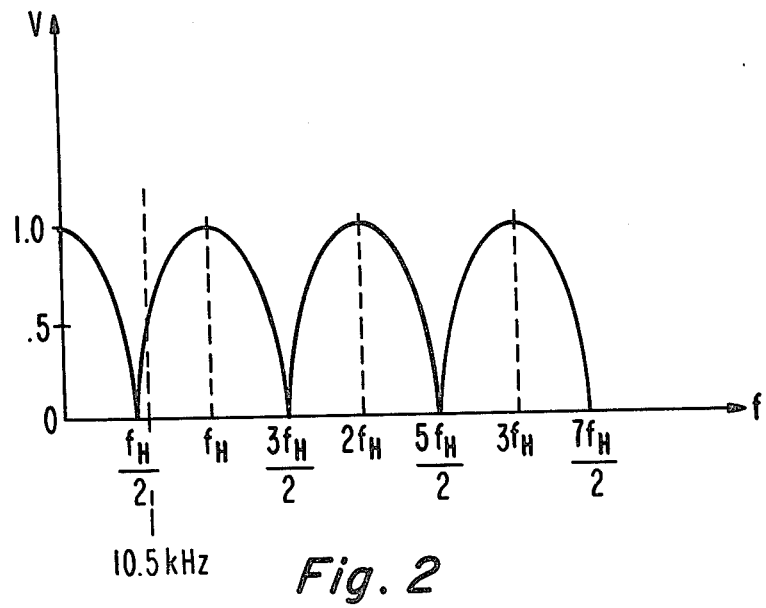
FIG. 2 is a graph showing the frequency response of one output of the comb filter of FIG. 1.

The present invention uses the characteristics of the comb filter to reduce the effect of co-channel interference on the operation of the sync separator. FIG. 2 is a graph of the luminance information signal frequency response spectrum of a comb filter having a 1-H delay, such as the comb filter 16 shown in FIG. 1. It can be seen that the luminance information signal response to the comb filter is at a relative maximum at integral multiples of the line frequency, $f_H$, and at a relative minimum or null at odd multiples of one-half the line frequency. The luminance information spectrum therefore includes the horizontal synchronizing pulses, which occur at the line frequency $f_H$.

The co-channel interference beat frequency of 10.5 kHz. will occur in the luminance signal frequency response spectrum at a location, shown in FIG. 2, which is somewhat attenuated by the action of the comb filter. The amount of attenuation and hence the amount of reduction in the co-channel interference beat signal can be calculated by an evaluation of the amplitude function of the response curve of FIG. 2. This amplitude function can be expressed as $V_{out}=E|\cos f_H/f_X \pi|$, where E=constant and $f_X$=desired frequency. Using the co-channel beat frequency of 10.5 kHz. as $f_X$ and 15.734 kHz. as $f_H$, $V_{out}=E|\cos 10.5/15.734 \pi| =0.5$ E. For $f_X=f_H$, $V_{out}$ is equal to E.

It is, therefore, obvious that the operation of the comb filter reduces the amplitude of the co-channel beat signal by a factor of 2, with respect to the desired horizontal sync signals occuring at $f_H$. This factor of 2 corresponds to a gain in signal/noise of 6 db.

Figure 3:
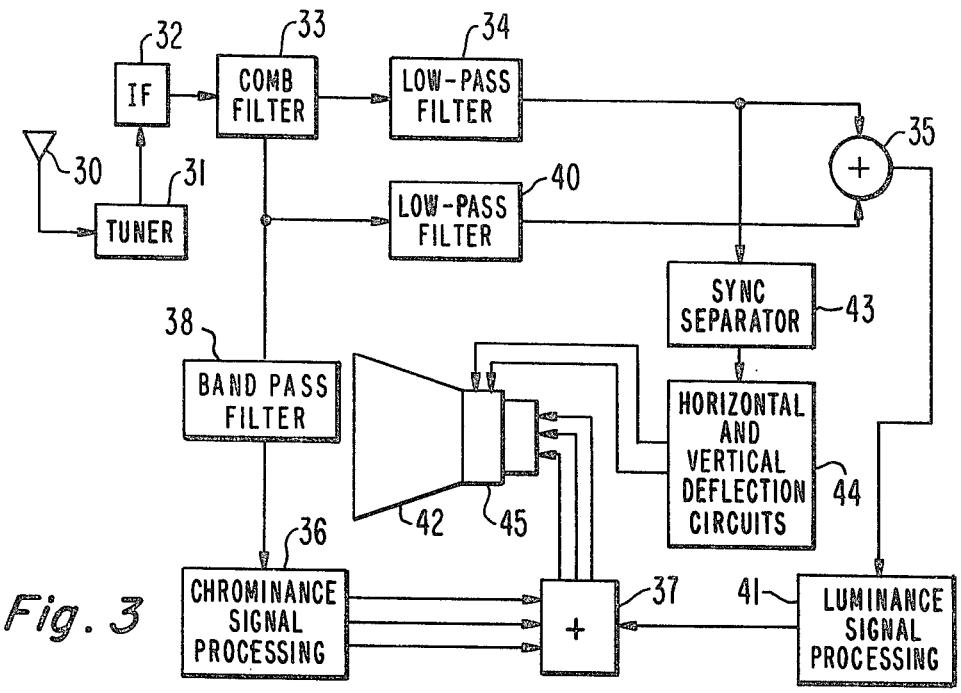
FIG. 3 is a block diagram of a portion of a television receiver in accordance with one embodiment of the present invention.

Referring to FIG. 3, there is shown in block diagram form a television receiver constructed in accordance with the present invention. RF signals from antenna 30 are coupled to tuner 31 which supplies an appropriate intermediate frequency signal to IF circuit and video detector 32. The composite video signal from IF circuit 32 is coupled to comb filter 33 which produces a luminance information signal and a chrominance information signal. The luminance information signal is processed by a low-pass filter 34 to remove comb filter noise and is applied to one input of a summing circuit 35. The chrominance information signal is applied through a band-pass filter 38 to a chrominance signal processor 36 which generates the color difference signals and couples them to a summing circuit 37. The chrominance information signal is also processed by a low-pass filter 40 and thereafter coupled to another input of summing circuit 35 to restore vertical detail to the luminance information signal that was removed by operation of comb filter 33. The output of summing circuit 35 to a luminance signal processor 41 which in turn is coupled to summing circuit 37. The color signals from summing circuit 37 are coupled to the drivers of kinescope 42.

In accordance with the present invention, the output of low-pass filter 34 is applied to a sync separator 43. Sync separator 43 provides horizontal and vertical sync pulses to deflection circuits 44 which drive the deflection yoke 45. The location of the sync separator take-off point in the luminance information signal path after comb filter 33 realizes a 6 db reduction in the amplitude of the 10.5 kHz. co-channel beat note, for the reasons stated with respect to the discussion relating to FIG. 2. It is important that the sync take-of point also be located ahead of summing circuit 35; i.e., before low frequency vertical detail is added to the luminance information signal. The output signal from summing circuit 35 restores to the luminance signal the low frequency information which was removed by action of the comb filter. The reduction in 10.5 kHz. beat note amplitude is only realized if the synchronizing pulses are derived prior to restoration of low frequency vertical detail information to the luminance signal.

One potential disadvantage of the arrangement shown in FIG. 3 is that the line averaging characteristic of the comb filter 33 may disrupt vertical synchronization due to the averaging of equalizing pulses with video information in certain lines. It is, therefore, desirable to utilize the circuit of FIG. 3 with a vertical deflection circuit that is not dependent upon equalizing pulses, such a vertical deflection circuit that derives its sync signals from a countdown of the horizontal sync pulses, or by use of a vertical deflection circuit designed and adjusted to tolerate the disruption of the equalizing pulses.

Figure 4:
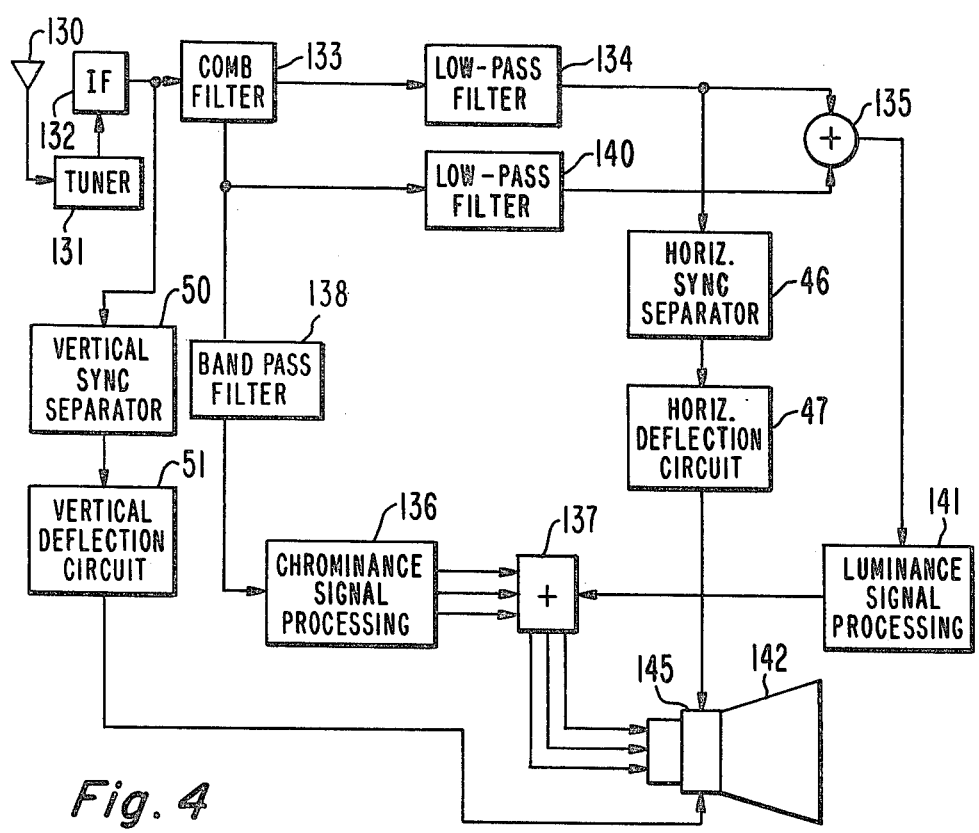
FIG. 4 is a block diagram of a portion of a television receiver in accordance with a second embodiment of the present invention.

Another solution to the problem of the disruption of vertical equalizing pulses is shown in FIG. 4. FIG. 4 illustrates in block diagram form a television receiver similar to that shown in FIG. 3. Corresponding components in FIG. 4 will be identified by the numerical designation used in FIG. 3 plus 100. In accordance with the invention shown in FIG. 3, the output of low-pass filter 134 is coupled to a horizontal sync separator 46 which derives the horizontal sync pulses from the luminance information signal and applies them to a horizontal deflection circuit 47 which in turn drives the horizontal windings of deflection yoke 145. The output of IF circuit 132 is coupled to a vertical sync separator 50 which derives the vertical sync pulses from the composite video signal. The vertical sync pulses are coupled to a vertical deflection circuit 51 which drives the vertical deflection windings of yoke 145.

The division of the sync separator into horizontal and vertical components permits the realization of a reduction in co-channel beat note amplitude without disrupting vertical synchronization.

It is also possible to use a comb filter having a delay of two horizontal lines in which three lines are averaged to derive the luminance and chrominance information signals. An analysis of the amplitude function of this comb filter reveals that a 0.12 db reduction in co-channel interference beat signal amplitude is realized, which further improves the operation of the sync separator.

What is claimed is:

1. A color television receiver for reducing synchronization disruption caused by co-channel interference of the type where co-channel signals having offset carrier frequencies combine to form interfering beat frequency pulses, said pulses causing disruption of said receiver synchronization, said receiver comprising:

a source of video signals, said signals including said interfering beat frequency pulses;

a comb filter coupled to said source of video signals and having a first output for producing a luminance information signal having a frequency response exhibiting signal components at regularly spaced spectral locations and having a second output for producing a chrominance information signal having a frequency response exhibiting signal components at regularly spaced spectral locations different from said luminance signal components, said luminance information signal exhibiting a reduction in the amplitude of said interfering beat frequency pulses; and a synchronizing separator coupled to said first output of said comb filter for deriving a synchronizing signal from said luminance information signal, said synchronizing signal being substantially free of interference from said interfering beat frequency pulses.

2. In a TV receiver incorporating a comb filter having an output for providing separated luminance and chrominance information signals, said receiver subject to receiving first and second co-channel program signals, said second signal interfering with said first signal, said signals combining such that said receiver produces a video signal having interfering signal components, said interfering signal components disrupting the synchronization of said TV receiver in the absence of compensation therefor, the improvement comprising: a synchronizing pulse separator coupled to said comb filter output for deriving synchronizing pulses from said luminance information signal, said luminance information signal exhibiting a reduction in the amplitude of said interfering signal components with respect to said video signal.

* * * * *